United States Patent
Rehm

(10) Patent No.: US 12,153,981 B2
(45) Date of Patent: Nov. 26, 2024

(54) LABELING SET FOR MARKING A PHARMACEUTICAL VESSEL AND PHARMACEUTICAL PACKAGING UNIT

(71) Applicant: Schreiner Group GmbH & Co. KG, Oberschleissheim (DE)

(72) Inventor: Arne Rehm, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 316 days.

(21) Appl. No.: 17/440,015

(22) PCT Filed: Mar. 13, 2020

(86) PCT No.: PCT/EP2020/056946
§ 371 (c)(1),
(2) Date: Sep. 16, 2021

(87) PCT Pub. No.: WO2020/200706
PCT Pub. Date: Oct. 8, 2020

(65) Prior Publication Data
US 2022/0180143 A1    Jun. 9, 2022

(30) Foreign Application Priority Data
Mar. 29, 2019   (DE) .................... 10 2019 108 253.6

(51) Int. Cl.
*G06K 19/073* (2006.01)
*B65C 9/00* (2006.01)
(Continued)

(52) U.S. Cl.
CPC ..... *G06K 19/07381* (2013.01); *B65D 25/205* (2013.01); *G06K 19/0776* (2013.01);
(Continued)

(58) Field of Classification Search
None
See application file for complete search history.

(56) References Cited

U.S. PATENT DOCUMENTS

| 8,674,834 B2 | 3/2014 | Phaneuf et al. |
| 8,783,454 B2 | 7/2014 | Igo |

(Continued)

FOREIGN PATENT DOCUMENTS

| CN | 1898686 A | 1/2007 |
| CN | 102666304 A | 9/2012 |

(Continued)

OTHER PUBLICATIONS

Decision of Refusal mailed Apr. 18, 2023 in Japanese Patent Application No. 2021-560325, with English translation.
(Continued)

*Primary Examiner* — Thomas S McCormack
(74) *Attorney, Agent, or Firm* — Collard & Roe, P.C.

(57) ABSTRACT

A labeling set for marking a pharmaceutical vessel including a body having a peripheral surface and a removable closure includes: a three-dimensional molded attachment, a label for sticking on the outer vessel circumference to be marked, and an RFID transponder for electronic identification of the vessel and/or contents. The attachment is mountable and/or positionable on the vessel in a predefined relative position and has a circumferential wall with an outer circumferential surface which is intended as an additional labelable and/or electronically identifiable outer wall and/or outer surface and whose radius, outer circumference and/or wall course is selected in accordance with the radius, outer circumference and/or wall course of the vessel circumferential surface. The label and/or the RFID transponder sticks over and/or covers both a circumferential surface, formed in accordance with the vessel body outer circumference, and the attachment
(Continued)

Figure 4:
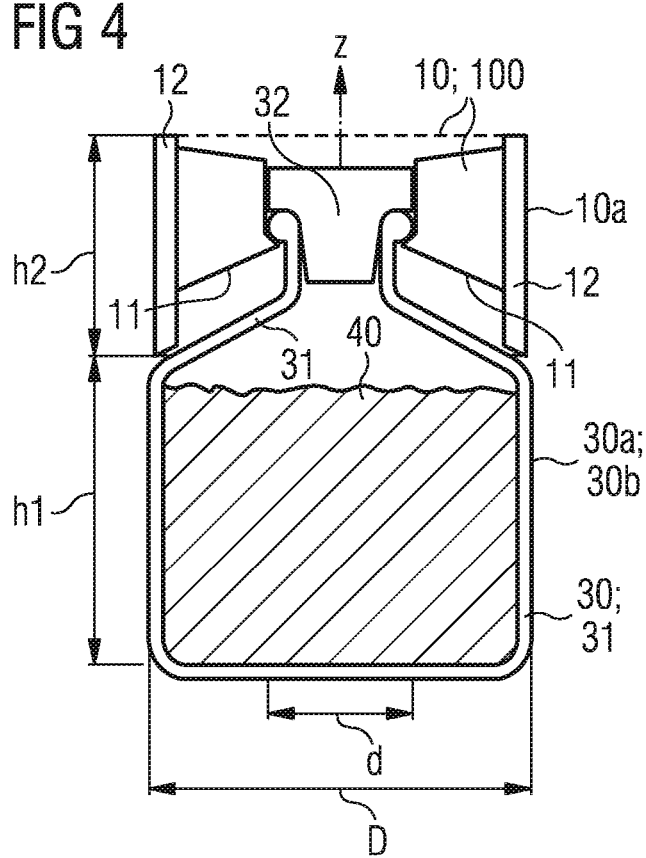

circumferential surface at least in regions and/or to secure the vessel attachment to the vessel.

13 Claims, 3 Drawing Sheets

(51) Int. Cl.
    *B65D 25/20*     (2006.01)
    *G06K 19/077*     (2006.01)
    *G09F 3/03*     (2006.01)

(52) U.S. Cl.
    CPC .... *G09F 3/0335* (2013.01); *B65C 2009/0003* (2013.01); *B65D 2203/10* (2013.01)

(56) References Cited

U.S. PATENT DOCUMENTS

| | | | |
|---|---|---|---|
| 8,998,097 | B2 | 4/2015 | Launiainen |
| 9,286,565 | B2 | 3/2016 | Arai et al. |
| 9,649,255 | B2 | 5/2017 | Roura Fernandez et al. |
| 10,035,624 | B2 | 7/2018 | Bauss |
| 2005/0162277 | A1 | 7/2005 | Teplitxky et al. |
| 2005/0242957 | A1 | 11/2005 | Lindsay et al. |
| 2007/0069895 | A1 | 3/2007 | Koh |
| 2007/0139205 | A1* | 6/2007 | Tanaka .................. G06K 19/073 340/568.2 |
| 2007/0152829 | A1* | 7/2007 | Lindsay ........... G06K 19/07345 340/10.2 |
| 2008/0061153 | A1 | 3/2008 | Hickle et al. |
| 2008/0308443 | A1 | 12/2008 | Baklycki et al. |
| 2012/0261379 | A1* | 10/2012 | Lenahan ............ B65D 51/1672 220/259.3 |
| 2015/0090625 | A1* | 4/2015 | Bauss .................. B65D 23/085 206/459.5 |

FOREIGN PATENT DOCUMENTS

| | | |
|---|---|---|
| CN | 102822849 A | 12/2012 |
| CN | 104395197 A | 3/2015 |
| CN | 104411597 A | 3/2015 |
| CN | 105329537 A | 2/2016 |
| DE | 10 2012 112 297 A1 | 6/2014 |
| DE | 10 2019 103 878 A1 | 6/2020 |
| EP | 2 847 082 B1 | 9/2016 |
| JP | 2008-123282 A | 5/2008 |
| JP | 2008-307360 A | 12/2008 |
| JP | 2010-091614 A | 4/2010 |
| JP | 2015-504751 A | 2/2015 |
| WO | 94/25089 A1 | 11/1994 |
| WO | 99/65548 A1 | 12/1999 |
| WO | 2013/167701 A1 | 11/2013 |
| WO | 2014/106129 A1 | 7/2014 |
| WO | 2016/156296 A1 | 10/2016 |
| WO | 2017/144366 A1 | 8/2017 |

OTHER PUBLICATIONS

International Search Report in PCT/EP2020/056946, mailed Jun. 17, 2020.
German Search Report in DE 10 2019 108 253.6, dated Dec. 11, 2019, with English translation of relevant parts.
Japanese Examination Report in JP 2021-560325, mailed Oct. 4, 2022, with English translation.
Chinese Office Action and Search Report dated Feb. 4, 2024 in Chinese Application No. 202080026308.7, with English and German translations.

* cited by examiner

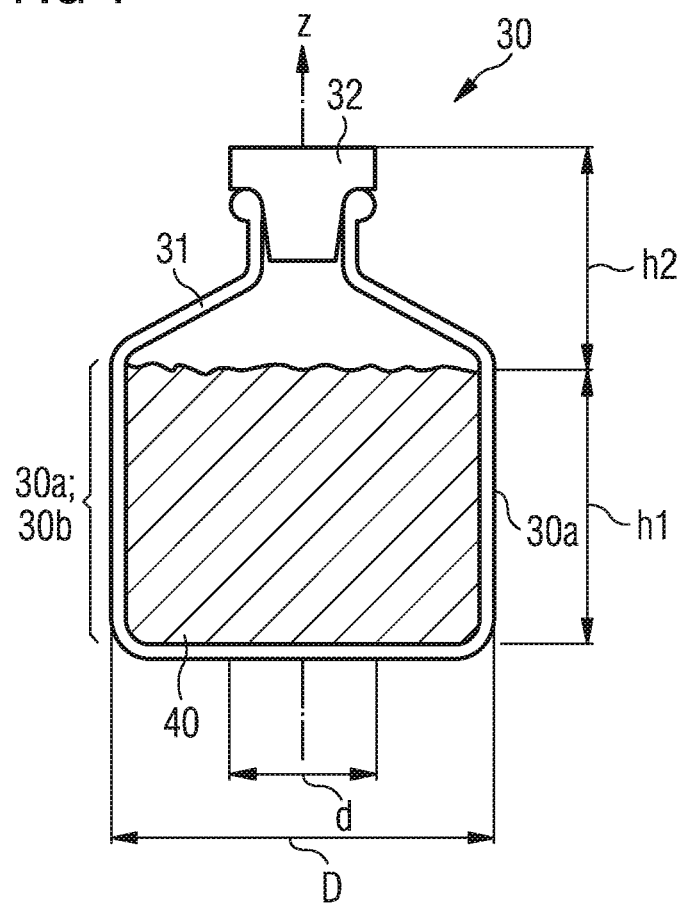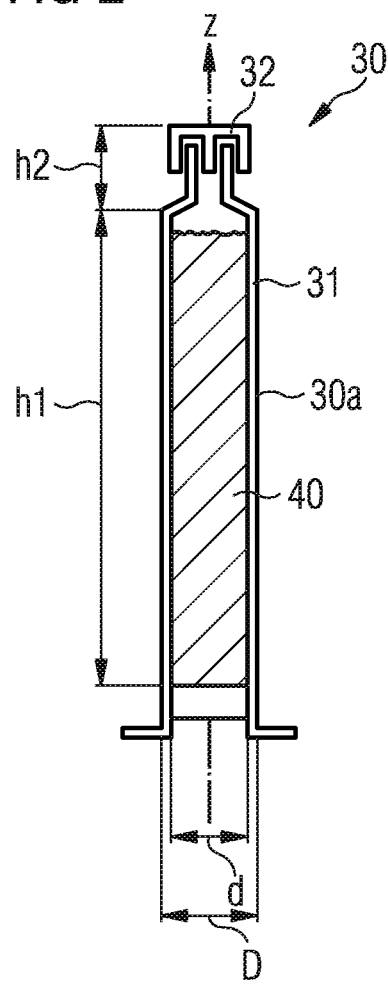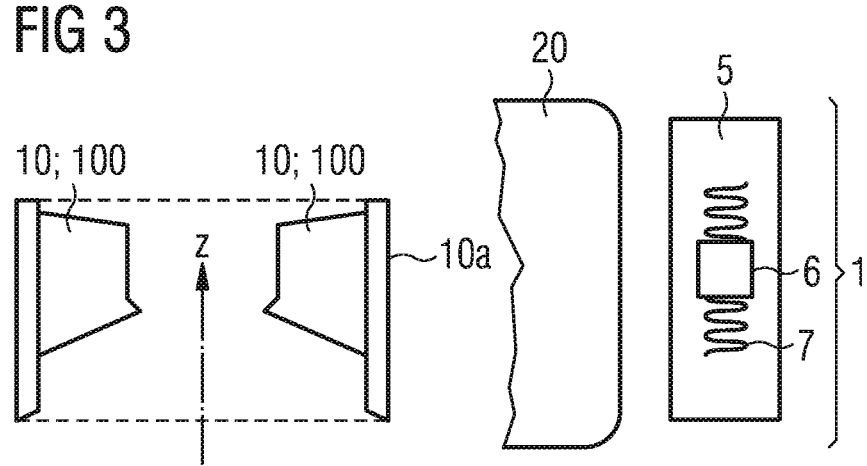

LABELING SET FOR MARKING A PHARMACEUTICAL VESSEL AND PHARMACEUTICAL PACKAGING UNIT

CROSS REFERENCE TO RELATED APPLICATIONS

This application is the National Stage of PCT/EP2020/056946 filed on Mar. 13, 2020, which claims priority under 35 U.S.C. § 119 of German Application No. 10 2019 108 253.6 filed on Mar. 29, 2019, the disclosure of which is incorporated by reference. The international application under PCT article 21(2) was not published in English.

The present application relates to a labeling set for marking a pharmaceutical vessel. The application further relates to a pharmaceutical packaging unit.

Pharmaceutical vessels, such as vials, ampoules, cartridges or syringes, etc., require a label to identify their contents, such as drug solutions, which is usually applied to an outer peripheral surface of the vessel. The label often has other functions as well; for example, it is often intended to indicate whether the vessel has already been opened or whether it has been tampered with; such labels are then also used for authorization and authentication, i.e. as proof of authenticity or origin.

The surface area available for labeling or other identification is often limited and scarce; there are various types of labels, such as multilayer labels or booklet labels, to accommodate sufficient information at or on the container. Mostly, however, single-layer labels are used, at least for pharmaceutical vessels, as they are easier to handle and process.

Nevertheless, the question of other ways to increase the labeling area always remains topical, since it can never be ruled out that as yet unthought-of solutions may exist to remedy the lack of space on the usually quite small-dimensioned pharmaceutical vessels.

It is the task of the present application to provide such a hitherto novel solution for better accommodation or attachment of information and/or for otherwise marking pharmaceutical vessels.

This task is solved by the labeling set and by the pharmaceutical packaging unit disclosed herein.

Figure 5:
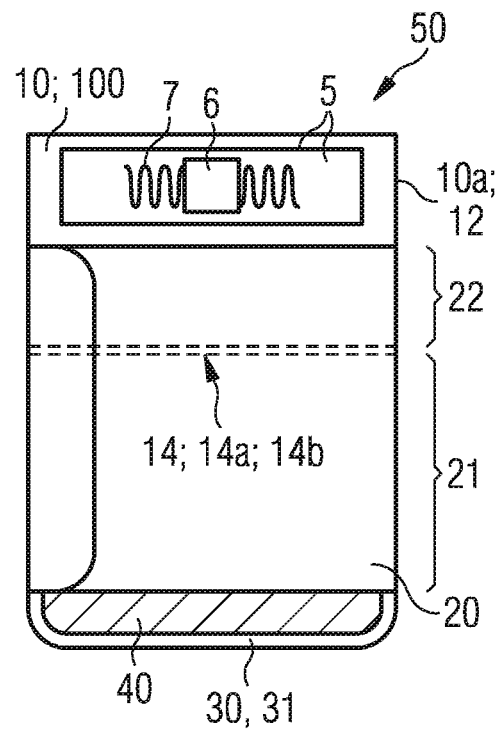
Figure 6:
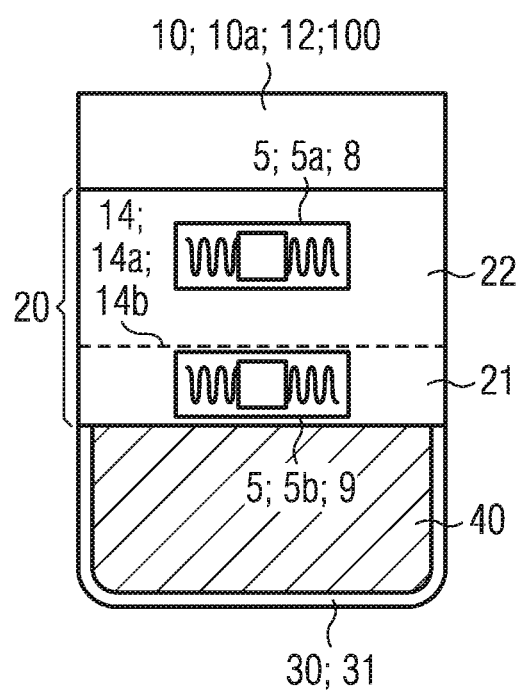
Figure 7:
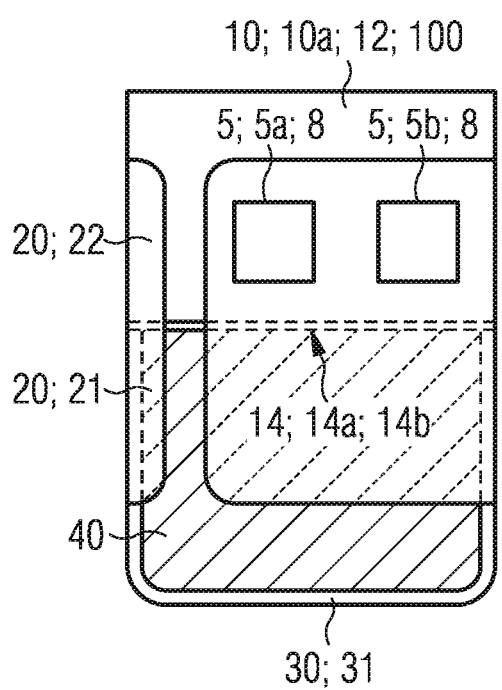
Figure 8:
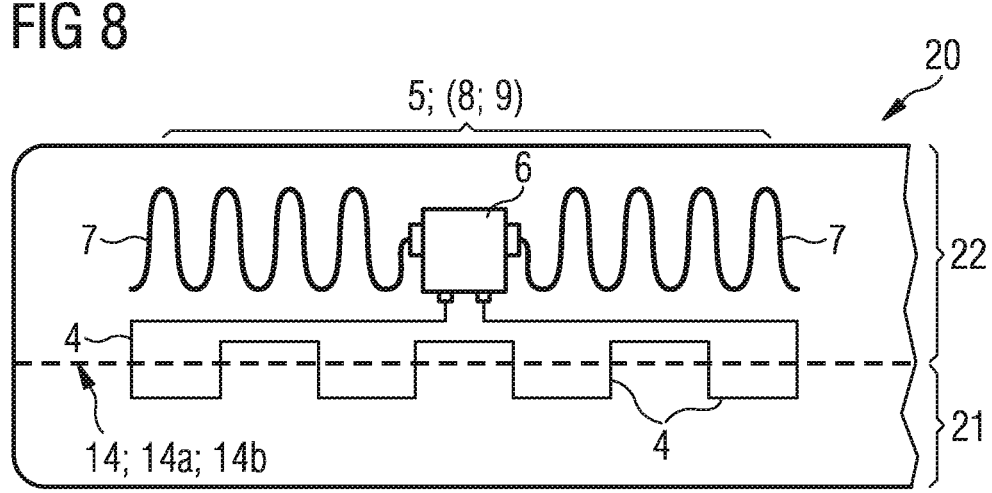
Figure 9:
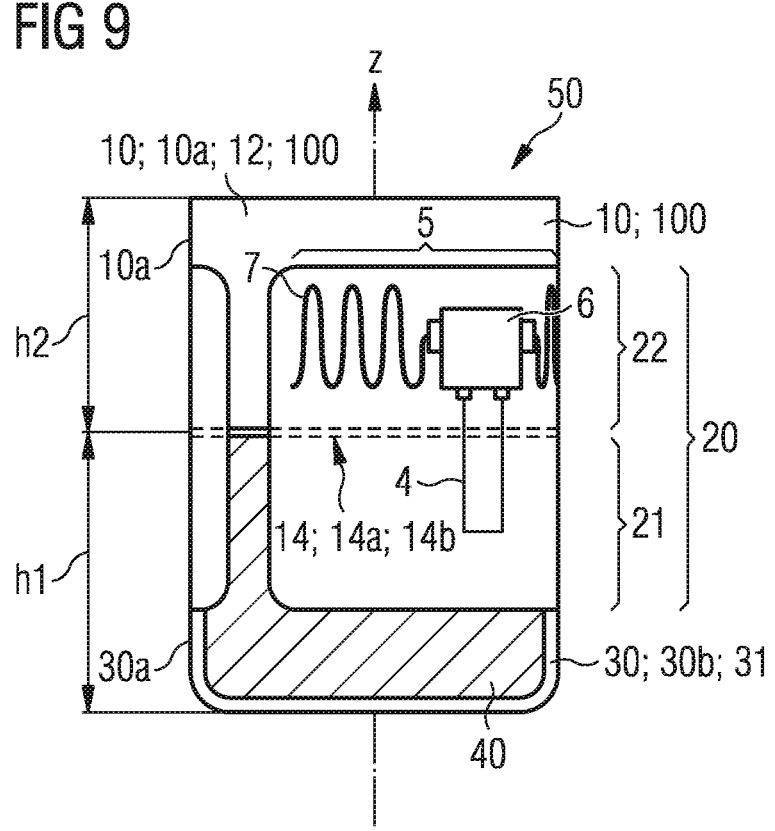

Some representative exemplary embodiments are described below with reference to the figures. They show:

FIGS. 1 and 2 two exemplary pharmaceutical vessels having a vessel body with a peripheral surface and a removable vessel closure, FIG. 3 an example of a labeling set comprising a vessel attachment, a label and a transponder, FIG. 4 the vessel attachment of FIG. 3, placed and/or mounted on the vessel of FIG. 1, FIG. 5 the pharmaceutical packaging unit according to a first embodiment obtained by assembling the components of the labeling set of FIG. 3 and the pharmaceutical vessel of FIG. 1, FIG. 6 a further embodiment of a packaging unit obtained by using a vessel and a different labeling set, with several individually variable individual features, but shown here in combination with one another, FIG. 7 a further embodiment of a packaging unit obtained using a vessel and a different labeling set for marking, with several individual features which can be varied individually, but which are shown here in combination with one another, FIG. 8 a label with an RFID transponder with a measuring line for testing a cut-through of a cut-through area of the label, and FIG. 9 a packaging unit with a label and an RFID transponder similar to FIG. 8 with a measuring line for testing a cut-through of the label.

FIGS. 1 and 2 illustrate, by way of example, two pharmaceutical vessels 30 that are filled or fillable with a pharmaceutical liquid 40 and that require labeling. Pharmaceutical vessels 30 within the meaning of this application are all vessels that are usable for storing, transporting, withdrawing and/or administering pharmaceutical liquids, whereby pharmaceutical liquids are to be understood as all liquids that can be used or examined in the pharmaceutical or medical field, including body fluids, blood sera, etc. (including emulsions or other combined aggregate state mixtures; such as those with precipitates).

A pharmaceutical vessel containing, for example, a drug solution to be administered is typically identified by a label affixed to the surface of the vessel 30. A pharmaceutical vessel 30 typically includes a vessel body 31, which constitutes the main component of the vessel 30, and a removable vessel closure 32. Pharmaceutical vessels, or at least their vessel bodies, are usually symmetrical with respect to an axial direction z, which is often an axis of rotational symmetry of the vessel; the vessel body 31 then has a circumferential surface 30a that circumscribes the axial direction z. In particular, the circumferential surface of a pharmaceutical vessel 30 is the circumferential surface 30a of the vessel belly 30b which encloses the air volume for filling with the pharmaceutical liquid 40.

While FIG. 1 shows a vial as the pharmaceutical vessel 30, FIG. 2 shows a syringe provided or to be provided with a Luer-Lock thread; for example, a COC/COP syringe. In addition, however, any pharmaceutical vessels 30 can be equipped and marked with the proposed labeling set; for example, ampoules, cartridges, vials, syringes or other vessels with any connections, such as with Luer-Lock connections or Luer-Lock threads, with flip-off closures, with needle-shield or needle-trap attachments, or any other packaging forms of pharmaceutical vessels. In most of them, the vessel body 31 is usually formed as a round body anyway; however, this is not absolutely necessary.

FIGS. 1 and 2 show that the vessel closure 32 has an (outer) diameter d in the radial direction which is smaller than the (outer) diameter D of the (in these cases actually rotationally symmetrical) vessel 30 or vessel body 31. In particular, the vessel belly 30b is often larger in diameter or radius than the closure 32.

Conventional marking is therefore usually carried out by means of a label 20 which is glued onto or around the circumferential surface 30a of the vessel body 31 or its belly 30b (overround label). To increase the label area, multilayer labels; in particular booklet labels with multiple sheets or foils are sometimes in use. In any case, the size of the surface area available for labeling and thus for vessel marking depends on the size and geometry of the vessel to be marked itself; the area to be labeled is usually given by the circumference or diameter of the vessel body 31 or vessel belly 30b and by the height of the vessel belly 30b or other fillable section of the vessel; this height is indicated in FIGS. 1 and 2 as height section h1. In a further height section h2, in which the closure 32 is arranged, the outer diameter d of the closure 32 is often smaller; in some cases considerably smaller than the outer diameter D of the vessel body 31 or vessel belly 30b, so that application of a label there is out of the question or only exceptionally or only in small surface portions of the closure surface.

The present application provides a labeling set 1 with which such and other vessels, in particular pharmaceutical vessels 30, can be labeled in such a way that a pharmaceutical packaging unit 50 with an enlarged labeling surface is obtained.

Labeling is understood here not only as inscriptions in the form of printed or otherwise applied text components or other information components readable by humans or suitable scanning devices (smartphones or other reading devices, etc.), such as can be applied to the pharmaceutical vessel 30 by means of a label, in particular an adhesive label, but also as electronic data that can be stored in a transponder, in particular an RFID transponder, for example, and can be read therefrom (if necessary, can also be written in subsequently). The labeling set 1 therefore also comprises at least one RFID transponder, which is to be attached to the vessel in addition to the label or at least is to be arranged somewhere else on or in the pharmaceutical packaging unit 50, which comprises the pharmaceutical vessel 30 and the labeling set 1.

The labeling set described with reference to the following figures enables better, in particular space-saving and therefore simpler marking of pharmaceutical vessels 30.

FIG. 3 schematically shows an exemplary embodiment of a novel labeling set 1 provided according to this application. The labeling set 1 comprises at least a vessel attachment 10, a label 20 and an RFID transponder 5. The vessel attachment 10 is formed as a three-dimensional molded part 100; it is preferably an injection-molded part made of plastic. Preferably, the molded part 10; 100 or at least its peripheral wall 12 or its outer peripheral surface 10 is symmetrical, in particular rotationally symmetrical with respect to an axial direction z.

The molded part 100 is provided to enable and/or facilitate labeling and/or electronic identification of the vessel at the level of or in the vicinity of the vessel closure 32. In most pharmaceutical vessels 30, the vessel closure 32 has an outer diameter d which is smaller than the outer diameter D of the vessel belly 30b or of the other part of the actual vessel body 31 enclosing the liquid volume 40. In the case of pharmaceutical vessels 30 formed in this manner, it is not possible to apply a label from the outside around the closure; in particular, not around the vessel belly and the closure together, if the transition between the vessel belly and the closure is also to be bridged and the label is also to run almost completely around the circumference in the bridging region.

When bridging the neck of the vessel, where the diameter or radius of the vessel narrows from D to d, overlabeling is at least not possible without wrinkling, i.e. a high susceptibility to damage for the label; especially if the label or other marking element is to completely or largely encircle the circumference of the vessel.

To achieve a predefined relative position relative to the vessel 30, the vessel attachment 10 has a suitable internal contour 11 which serves, for example, to mechanically engage or interlock with the vessel closure 32, with the vessel body 31, or with both, and which at least temporarily secures this predefined relative position. The final fixing and/or positioning of the vessel top 10 can also be effected only by the application of the label 20 and/or the RFID transponder 5; preferably by the label 20 of the labeling set 1 gluing around both the vessel body 31 and the vessel top 10 and permanently securing their relative position with respect to each other; in any case until the first use or until the first opening of the vessel 30 equipped with the labeling set 1.

The main element of the three-dimensional molded part 100 or of the vessel attachment 10 in FIG. 3 is a circumferential wall 12 (preferably continuous around an axial direction z of the vessel attachment 10), which is also the first thing to be noticed when the vessel connected thereto is viewed, for example from the side. The radially outwardly pointing circumferential surface 10a of this circumferential wall 12 can preferably, but not necessarily, be placed or supported on an upper end of the vessel body 31 or vessel belly 30b; this circumferential surface 10a of the circumferential wall 12 serves to enlarge the circumferential surface of the vessel to be labeled, in particular to extend the latter in the direction z and thus to artificially exaggerate its height dimension in the direction z. Here, the circumferential wall 12 of the vessel attachment 10, placed on the vessel 30 in the predefined relative position, may well extend even further in the direction z than the vessel closure 32 itself.

The respective vessel attachment 10 is always a more or less rigid molded part; in particular, a solid molded part, i.e., one that cannot be produced simply by bending, buckling or otherwise forming a film, such as a plastic film. The solid design of the vessel attachment 10 also prevents accidental pressure or impact from above on the vessel attachment 10 (in the direction of the vessel 30) from causing the vessel attachment 10 to expand at the lower edge and thus to come over the circumferential surface 30a of the vessel body 31; films as a material for the vessel attachment, on the other hand, would have only a low dimensional stability and in relation to plastic deformation as a result of external force effects.

FIGS. 4 and 5 show the vessel attachment 10 of the labeling set 1 of FIG. 3, now mounted or at least positioned on the vessel 30 or on its closure 32 and/or on its actual vessel body 31. For this purpose, FIG. 4 shows a transverse sectional view of the vessel 30, which is already filled with a pharmaceutical liquid 40, with the closure 32 mounted or at least positioned thereon. FIG. 5, on the other hand, shows a side view of the finished vessel 30 with all three individual components of the labeling set 1, namely with the vessel attachment 10 or the molded part 100, the label 20 and the RFID transponder 5, whereby a finished, novel pharmaceutical packaging unit 50 is created. FIG. 4 thus shows in cross-sectional view only the vessel attachment 10 on the vessel 30; still without representation of label 20 and RFID transponder 5, which are only shown in FIG. 5 as well.

The vessel attachment 10 proposed according to this application, for example in the form of the three-dimensional molded part 100 in FIG. 3 (explained here for the exemplary vessel from FIG. 1) solves the space problem; with the aid of this vessel attachment 10, an artificial enlargement of the markable area, in particular an extension of this area in the axial direction z, is achieved. For this purpose, the vessel attachment 10 is placed, pressed on, clamped on, plugged on, screwed on or otherwise mounted on the closure-side end of the vessel 30 or at least attached, applied or otherwise merely (pre-)positioned in a predefined relative position to the vessel. Regardless of the way in which the vessel attachment 10 is mounted or positioned on the vessel 30, on the vessel body 31 and/or on its closure 32, a suitable relative position of the vessel attachment 10 relative to the vessel, predefined by the contour of the vessel attachment 10, is created. This relative position can be seen in FIG. 4, in which the vessel 30 and the mounted molded part 100 or vessel attachment 10 are shown in cross-sectional view.

Since pharmaceutical vessels 30 are generally standardized vessels subject to, for example, European or international standardized dimensions, the dimensions of such vessels are known in advance. The injection molded or other molded part 100 intended as the vessel attachment 10 may therefore be shaped to interlock, flush or otherwise suitably engage with surface regions of the vessel 30. For example, in FIGS. 3 and 4, exemplary inwardly facing projections are indicated at the bottom inside of an inner contour 11 of the vessel attachment 10, such as in the form of spikes or other projections that serve to engage underneath the vessel closure 32 and/or a bead or other outer projection of the vessel body 31 surrounding the vessel opening. Such or other projections, like the inner contour 11 as a whole, may optionally extend outside the circumference of the vessel at certain azimuthal portions to the closure-side region thereof, or alternatively may be provided along the complete circumference in an azimuthally circumferential manner A circumferential wall 12 and/or an outer circumferential surface 10a of the vessel attachment 10, on the other hand, preferably run completely around the (smaller) circumference of the vessel closure 32 and/or a vessel neck in the azimuthal direction and ultimately have the effect of widening the radius or diameter d of the vessel closure 31 (and/or of the vessel 30 at the level of the vessel closure 32) up to that radius or diameter D which the vessel belly 30b or the other section of the actual vessel body 31 has at the level h1 below the vessel closure 32. At the level of the closure 31, the vessel attachment 10 overcomes the radial step between the vessel closure 32 and the vessel body 31, which conventionally stands in the way of labeling or other identification there, and makes it possible to apply a label and/or any transponder (in particular an RFID transponder 5) to the enlarged, common outer surface 30a, 10a of the vessel 30 and vessel attachment 10.

The upper side of the vessel attachment 10 facing in the direction of z can be closed or likewise also open or partially open, for example provided with holes or other openings or recesses. In this respect, the vessel attachment 10 or the (plastic) molded part provided as vessel attachment 10 does not necessarily represent a (secondary or additional) cap, but can also be a mere circumferential surface extension, whereas in the area of the head or front side of the vessel thus made up, marking is not necessarily facilitated or possibly (depending on the geometry) even made more difficult, which is, however, more than compensated for by the enormous gain in circumferential surface.

A further difference of the vessel attachment 10 presented here compared to a merely additionally fitted cap, or compared to any sleeve, is that the proposed vessel attachment does not embrace the vessel body 31 or at least its vessel belly 30b (or the other wall section 30a embracing the liquid-fillable vessel volume in the azimuthal circumferential direction). Instead, the radially outwardly facing circumferential surface 10a has only the same diameter D as the outwardly facing circumferential surface 30a of the vessel body 31 and therefore ends with its lower edge at the level of the upper edge of the circumferential surface 30a (designed according to the outer diameter D) or up to a few millimeters above it. In contrast to a conventional (secondary) cap, the vessel cap 10 presented here or its azimuthally circumferential wall 12 is thus not slipped over the vessel body 31 or in any case not over its vessel belly 30b or other outer wall section 30a, but is merely placed (if it comes into contact at all with the vessel belly 30b) on or above the vessel belly 30b or other outer wall section 30a, without achieving a larger radius, diameter or other circumference there than the vessel belly 30b or other outer wall portion 30a. This design allows for wrinkle-free labeling by a label 20 and/or RFID transponder 5, which is easier to achieve than with top caps or caps intended to be slipped over, which are even larger in diameter. Thus, the labelable and/or electronically identifiable marking surface of the vessel body 31 and/or of the vessel belly 30b is not covered by the vessel attachment 10, but is still raised or continued on the closure side or in the axial direction z, without any disturbing overlapping of the vessel attachment 10 with the vessel belly 30b in the axial and/or radial direction.

Otherwise, the vessel attachment 10, its inner contour 11 and/or optionally a mold element or other molded portion thereof may be formed as a mating or negative shape to a vessel neck of the vessel 30 and/or to the vessel closure 32 (or otherwise interlocking therewith). As a result, the vessel attachment 10 can be attached, put on, placed on or otherwise positioned in a predefined relative position on a standardized pharmaceutical vessel 30 to be characterized in accordance with the intended use, etc.

In the axial direction z, on the other hand, the circumferential wall 12 of the vessel attachment 10 or the outer surface 10a thereof, when the vessel attachment 10 is mounted and/or positioned in the predefined relative position on the vessel 30, extends to a greater (inter alia, axial) distance from the liquid 40 than the wall sections of the vessel body 31 to be marked and/or of the vessel closure 32, in particular also further in the direction z than those wall sections of vessel body 31 and vessel closure 32 which in the filled state of the vessel 30 normally reach up to the pharmaceutical liquid (for example when the vessel is stored in an upright position) or which (depending on the orientation of the vessel during transport or use) may at least temporarily reach up to the pharmaceutical liquid 40.

This artificial elevation of the marking surface, which is now composed of two partial surfaces 30a and 10a of the vessel body 31 and vessel attachment 10, unexpectedly provides a markable additional surface on the vessel 30; in particular, a markable additional surface in the area (approximately at the height or in the vicinity) of the vessel closure 32, where conventionally no ideal or in any respect practicable possibility for efficient marking is apparent.

FIG. 5 shows a schematic side view of the completed packaging unit 50 comprising the vessel 30 and the components 5, 10, 20 of the labeling set 1 located thereon. The RFID transponder 5 may, for example, preferably be glued, applied or nestled (for example, with the aid of the label 20 itself) at the height of the vessel attachment 10 on its circumferential surface 10a. The label, on the other hand, is preferably adhered to both circumferential surfaces 30a and 10a, i.e. to the vessel 30 and the vessel attachment 10. In particular, the label 20 can be used to attach or fix the vessel attachment 10 to the vessel 30.

In particular, the label 20 may comprise a first label section 21 for adhering and/or placing on the peripheral surface 30a of the vessel body 31 and a second label section 22 for adhering and/or placing on the peripheral surface 10a of the vessel top 10. A severing area 14 may be disposed between the two label sections 21, 22, which is intended to be damaged or destroyed as intended during or before opening of the vessel 30 provided with the labeling set 1. The separation area 14 may, as shown only schematically in FIG. 5, have one or more perforations 14a, punched holes or other weakening lines, a tear strip 14b and/or any other weakening structure, such as a foil or film area of low tear strength (without reference mark), which runs around e.g. the entire circumference of the vessel or a large part of the circumference in the azimuthal direction, namely in the height between the two height sections h1 and h2.

In FIG. 5, the label 20 is shown to be opaque; however, it is preferably transparent and provides a view of the drug solution or other pharmaceutical liquid 40 in the vessel volume of the vessel 30.

In FIG. 5, the RFID transponder 5 is shown above and outside the label surface 20 and is applied in particular to the circumferential surface 10a of the vessel attachment 10, which is artificially elongated in the direction z. The RFID transponder 5 may also be applied to the circumferential surface 10a of the vessel attachment 10. However, the transponder 5 can likewise be integrated into the label 20 or arranged on the underside of the label (i.e. in the radial direction between the label 20 and the outwardly facing circumferential surface 30a and/or 10a of the vessel body 31 and/or vessel attachment 10). After the label 20 (and/or, if applicable, also the RFID transponder 5) has been opened or severed for the first time as intended, the vessel attachment 10 can be separated from the vessel body 31 together with the vessel closure 32; alternatively, the vessel top 10 can also be separated individually from the closure 32 or from the vessel 30 as a whole before the closure 32 is opened, i.e. separated from the vessel body 31 or at least loosened or loosened. As long as the label 20 and/or the RFID transponder 5 are still undamaged, they are suitable for securing the vessel attachment 10 to the vessel 30 or, however, as initial opening detection elements, for indicating at least one opening or other manipulation of the assembled receptacle 50.

With regard to the transponder 5, which can be used, for example, for electronic identification of the vessel 30, its contents 40 and/or for storing other data relating to the medicament fluid, its use and/or other medical-application-related circumstances, the following embodiments are particularly suitable:

With regard to the positioning of the RFID transponder 5, for example, it is intended to glue, lay or otherwise apply the transponder 5 to the circumferential surface 10a of the vessel attachment 10 and/or to the circumferential surface 30a of the vessel 30. For example, the transponder 5 may be adhered to the label backing and adhered or dispensed together with the label 20 to the enlarged peripheral surface 30a, 10a. Preferably, the RFID transponder 5 is glued or otherwise applied in the area exclusively of the circumferential surface 10a of the vessel attachment 10, whereby the transponder does not cover any surface areas of the actual vessel wall 30a, in particular not those of the vessel belly 30b, where the unobstructed view of the medicament liquid (for example, for assessing its quantity or condition, etc.) could be impaired.

In particular, the RFID transponder 5 may be a UHF RFID transponder 5, such as for one or more standardized communication frequencies in the range between 860 and 960 MHz. This embodiment has the advantage that the UHF RFID transponder 5 can be detected or read over longer ranges of up to 3, possibly up to 10 meters, whereas conventional HF RFID transponders or NFC RFID transponders (Near Field Communication) can only be read over a few centimeters; for example by smartphones or special readers. By using UHF RFID transponders, on the other hand, all transponders in a specific section of a building, cabinet or other storage area could be detected simultaneously in the future; time-consuming individual detection would be unnecessary in the future.

FIGS. 6 and 7 show two further embodiments with regard to the number and design of transponders for the labeling set 1 and the vessel 30 marked therewith, respectively. Both FIGS. 6 and 7 show several marking options combined with each other, which, however, can also be realized individually instead of combined with each other in this manner Both FIGS. 6 and 7 show a respective finished packaging unit 50 in a side view corresponding to that in FIG. 5.

Thus, the labeling set 1 may comprise a first RFID transponder 5a and a second RFID transponder 5b, wherein at least the first RFID transponder 5a is a UHF RFID transponder 8 intended for sticking and/or positioning in a height section h2 offset in the axial direction z with respect to the vessel contents 40, i.e., where the circumferential wall is located. i.e. where the circumferential wall 12 or circumferential surface 10a of the vessel attachment carries or supports this UHF RFID transponder 5; 5a; 8 at a greater distance from the vessel content 40.

The second RFID transponder 5b, on the other hand, may be a conventional NFC or HF RFID transponder 9; optionally for positioning on the vessel wall 30a or for positioning also on the higher vessel attachment wall 10a.

For the use of UHF RFID transponders 5; 8, positioning at the higher vessel attachment surface 10a offers the advantage that adverse influences of the drug fluid 40 on the performance, in particular readability (especially due to absorption of electromagnetic radiation during communication with the transponder) are significantly reduced as a result of the greater distance from the vessel content 40; UHF transponders 8 and their detection are more reliably readable and/or detectable in this transponder position, namely when attached to the circumferential surface 10a, or in any case (from outside or also inside) to the circumferential wall 12 of the vessel attachment 10.

Like any RFID transponder 5, such a UHF RFID transponder 8 has both a transponder chip 6 and a transponder antenna 7 (see FIG. 5).

With regard to the variably designable additional individual features, on the one hand the label 20 is non-transparent according to FIG. 6, on the other hand it is transparent according to FIG. 7. In both figures, the position or height position of the label 20 and/or of the at least one transponder 5 along the direction z (see further above) includes and/or covers the transition between h1 and h2, i.e. the axial position between the annular contact surface of the upper rounding of the vessel belly 30b and the lower edge of the circumferential edge of the vessel belly 30b and resting thereon (up to approx. one millimeter above) the lower edge of the peripheral wall 12 of the vessel attachment 10. At (approximately or exactly) the same height is also the separation area 14 (of the label 20 and/or of the transponder 5), along which at least the label 20 can be separated into its first, lower label section 21 and its second, upper label section 22. The severing area 14 may be or comprise a perforation 14a, punching or other line of weakness or a plurality thereof; for example in the form of a tear strip 14b (with or without a gripping tab) or alternatively any other weakening structure, such as a film or foil area of low tear strength (not shown). The azimuthally preferably circumferential cut-through area 14 of the label 20 can be marked by printing in color or black (for example, identified as a predetermined tear line); these and other details to be realized merely by printing the label surface, transponder surface and/or attachment surface are not specifically shown in the figures of this application for the sake of clarity.

Furthermore, the height extension of the label 20 or of the first label section 21 and second label section 22 is (differently) varied in FIGS. 6 and 7.

Both figures have in common that they each show two transponders, in particular RFID transponders 5, namely 5a and 5b (only schematically shown in FIG. 7). Insofar as conductive paths of transponder antennas 7 are drawn in this application, this representation is schematically simplified and therefore to be understood without restriction with regard to type, antenna shape, antenna path, frequency range or with regard to any other properties of the respective transponder. The same applies to the positioning, size of the transponder chip 6 and its connection to the transponder antenna 7.

Another difference between the embodiments of FIGS. 6 and 7 is that in FIG. 7, both RFID transponders 5a and 5b are located in the surface area of the second label section 22 intended to be adhered (or at least placed, pressed or otherwise placed or positioned) on the peripheral surface 10a of the vessel attachment 10. In contrast, in FIG. 6, the second 5b of the two RFID transponders is located in the surface area of the first label section 21 that is intended to be adhered (or at least placed, pressed or otherwise laid or positioned) on the peripheral surface 30a of the vessel 30.

In all embodiments in which the surface area of any transponder 5 overlaps with a surface area (e.g. 21; 22) of a label, it may in particular be provided that the transponder is glued or placed or positioned on the back of the label. Labels and transponders are preferably laid on and/or glued to the respective outer surface 30a and/or 10a of the vessel 30 and/or the vessel attachment 10. For example, the label backing is adhesive and adheres to the transponder 5 in a range; whereas outside thereof, it is adhered to the labeled outer surface 30a and/or 10a. The labels 20 are preferably foil labels, in particular single-layer foil labels.

In the embodiment example according to FIG. 6, as mentioned, e.g. the first RFID transponder 5a can be in particular a UHF RFID transponder 8, whereas the second RFID transponder 5b placed at the level of the vessel 30 or vessel belly 30b is optionally an HF RFID transponder 9 (for NFC communication; as shown) or another UHF RFID transponder.

In the latter case, this second UHF RFID transponder 5b can also be positioned on the vessel surface 30a (be it covered by a label 20 extending further down or its lower section 21, or also stuck to the vessel 30 exposed without a label cover). Such a placement on the vessel belly 30b, especially close to the vessel bottom (instead of close to the original, upper level as shown in FIG. 6) is suitable for level control, for example. Thus, if this second RFID transponder 5b (which would then, however, be designated by the reference sign 8; instead of "9" as shown in FIG. 6) is a (further) UHF RFID transponder, its positioning could be deliberately chosen below the fill level or liquid level of the pharmaceutical liquid 40 (cf. FIG. 1) in order to enable communication with this UHF RFID transponder 5b only when the vessel 30 is empty and thus the pharmaceutical liquid 40 is (almost) used up. As long as sufficient liquid is still contained in the vessel 30 at the level of the bottom of the vessel or at the level of the second UHF RFID transponder 5b, it absorbs the UHF communication signals of the UHF RFID transponder 5b or at least noticeably weakens their intensity; the transponder 5b is then not detected. This applies when the liquid level is sufficiently high; both for the still unopened vessel 30 and for a vessel 30 that has already been opened for the first time or several times, as long as sufficient volume of liquid 40 has not yet been removed or otherwise consumed. Only when the liquid level has dropped to the level of the transponder 5b or just below it (in each case with the container in the upright position as shown in FIG. 6), does the transponder 5b supply undisturbed signals and thus indicate that the vessel 30 is empty or almost empty.

In the unopened state of the vessel 30 marked with the labeling set 1, i.e. sealed by label 20 and/or transponder 5, only the first transponder 5a—optionally a UHF RFID transponder 8 as shown, or alternatively an HF RFID transponder (not shown)—supplies a signal; even if this first transponder 5a is a UHF RFID transponder 8, communication with it is not disturbed, since it is located at the level of the vessel attachment 10, i.e. in any case above the vessel attachment 10. i.e. in any case above the liquid level and thus spaced from the liquid. Since the circumferential wall 12 and its outer circumferential surface 10a are in any case oriented in the axial direction z (which in this application always designates the axial direction z of the vessel attachment 10 and, as soon as the latter is mounted or positioned on the vessel 30, at the same time also designates the axial direction of the vessel 30, which does not necessarily also correspond to the perpendicular or vertical direction opposite to the earth), the vessel attachment 10 can be positioned in the axial direction z of the vessel 30. If the second label section 22 is spaced from the inner volume which is more or less fillable with liquid 40, there is in any case a spacing of this and any other section of the transponder (here: 5a) and/or the label provided therewith which is glued or otherwise applied to the second label section 22. For a (first) UHF RFID transponder 5a; 8, this means that regardless of the orientation of the container (e.g. also upside down), the liquid 40 cannot in any case interfere with the communication with the UHF RFID transponder 5a; 8, since the latter does not abut against a wall of the fillable inner volume of the vessel 30, but against a wall, projecting therefrom, separated therefrom or otherwise, of the vessel attachment 10 axially spaced therefrom.

In the original new state of the marked vessel 30; 50, the still detectable communication signal of this UHF RFID transponder 5a; 8 (if positioned at the level of the vessel attachment 10) would initially indicate this unopened, unmanipulated and authorized new state of the marked vessel 30 or 50 (by corresponding measurement, i.e. electronic excitation and readout via radio). If such a transponder additionally has an (additional) antenna, conductor loop or other conductor section, which is inevitably destroyed or interrupted when the assembled vessel 30 or 50 is opened for the first time (e.g. by tearing open or tearing off at the level of the cut-through area; see below), the absence of the response signal of this transponder 5a indicates that the vessel is no longer in its original state, i.e. has either been opened for the first administration or emptying in an authorized manner or has been manipulated in an unauthorized manner Only when the vessel is largely emptied a signal again is measurable; however, this comes from the second, lower UHF RFID transponder 5b; 8 (modification compared to FIG. 6), which indicates that there is no longer sufficient liquid to interfere with or prevent communication with this UHF RFID transponder 5b; 8 by absorption.

Otherwise, however, as shown in FIG. 6—irrespective of the fill level—the second, lower RFID transponder 5b can also be an HF RFID transponder 9, which is intended for reading by means of a smartphone or reader, for example.

Also in principle, whenever only one transponder (or one of several) is provided in any embodiment of this message, this can optionally be an HF RFID transponder or a UHF RFID transponder (which may be more susceptible to interference, but is suitable for longer ranges).

In FIG. 7, both respective transponders 5a, 5b can each optionally be UHF RFID transponders 8 (as shown) or HF RFID transponders.

Another feature related to FIGS. 6 and 7, which, like the above features, can also be varied individually (rather than in combination with the other features shown in these figures), is that according to FIG. 6, the label 20 is an over-round label that completely encircles the vessel 30 and the vessel attachment 10; however, a view of the cut-through area 14 indicates the height to which the belly of the vessel 30 extends. In FIG. 7, on the other hand, the label 20 largely, but not completely, encircles the circumference of the vessel 30 and vessel attachment 10.

Of course, labels that cover much smaller portions of the circumference of vessel 30 and/or vessel attachment 10 may also be considered. For example, even if the labeling area on the vessel 30 itself is actually sufficiently large, the packaging unit 50 proposed here can be provided by means of the labeling set 1, for example in order to be able to operate a UHF RFID transponder at a greater distance from the vessel contents 40 and thus unaffected by interference from the vessel contents; this is often not reliably possible with UHF transponders directly on the vessel wall, on the rear or inner side of which water or another, usually water-containing liquid is enclosed.

FIG. 8 shows an exemplary RFID transponder 5, which additionally has a measurement line 4, namely a cut-through indicator line 4, which is provided in addition to the RFID antenna 7 and is connected to the RFID chip 6 (e.g. via further chip or bond contacts as indicated). The chip can check or determine by electrical measurement (such as of the electrical resistance or conductance of this measurement line 4 or by capacitive measurement) whether or not the cut-through measurement line 4 is interrupted.

In the embodiment example of FIG. 8, this RFID transponder 5 is connected to a label 20, which is intended to be stuck on or at least attached to the circumferential surface 30b of the pharmaceutical vessel 30 as well as to that circumferential surface 10b of the vessel attachment 10; again by means of the first label section 21 and the second label section 22, respectively. Between them runs the separation area 14, which as explained above can be in the form of one or more perforations (preferably with a tear strip between two of them), punch lines or other weakening lines or in the form of an area of reduced tear strength.

The separation measurement line 4 is guided in such a way that it crosses the severing area 14 (approximately a narrow line or strip between the two label sections 21, 22) once, twice or even more often (as shown). When the severing area 14 is torn open, i.e. when both label sections 21, 22 are separated from each other, the separation measurement line 4 is destroyed or at least interrupted; this interruption can be measured electrically and read out via the RFID transponder 5 or its chip 6. The electrical readout of the state of the measurement line 4 thus indicates whether the vessel 30 equipped with the labeling set 1, i.e. the completed packaging unit 50, has already been opened and/or tampered with or damaged during an opening attempt.

Of course, this requires first attaching the transponder 5 and label 20 to the vessel 30 and the vessel attachment 10 as shown in FIG. 9 (and similar to some previous figures). FIG. 9 shows the simpler case in which the measurement line 4 has only two crossing points at which it crosses the severing area 14. The design of the measurement line 4 according to FIG. 8, on the other hand, is suitable for checking the (local) integrity of the severing area 14, which is designed as a predetermined tear line or predetermined breaking point, over a larger azimuthal circumferential section of the vessel 30 and vessel attachment 10. The severing area 14 is expediently always located exactly or at least approximately at the level of the transition or contact surface between the (outer) vessel circumference, i.e. the upper edge of the circumferential surface 30a of the vessel 30, and the lower edge of the circumferential wall 12 or the circumferential surface 10a of the vessel attachment 10, i.e. at the transition between the height sections h1 and h2.

Instead of being a closed conductor loop, the measurement line 4 in FIGS. 8 and 9 can also be formed as an open measuring line or conductor section, e.g. as a further antenna of any course; for example for a further measuring frequency. Furthermore, the antenna 7 of this or the other figures or other embodiments can also serve simultaneously as a measurement line 4; in this case, the additional measurement line 4 is omitted.

All the features described up to this point can be combined individually or in combination with each other with any embodiment of the other figures, description components and patent claims; the selection of the feature combinations chosen above is in this respect merely exemplary.

The use of the vessel attachment 10 proposed herein increases the readability of RFID tags on liquid-filled primary containers (such as vials, cartridges, syringes, ampoules, etc.); in particular, UHF RFID tags, whose performance and/or readability is often impaired in direct proximity to certain liquids 40, are reliably readable due to the increased distance from the liquid 40 achieved by the vessel attachment 10. Moreover, in the case of transparent pharmaceutical primary containers such as syringes, vials, the unobstructed view of the vessel contents is no longer impeded by the RFID tag or RFID transponder, the design of which often includes opaque structures, since the transponder can now be applied away from the vessel surface, namely on the vessel attachment; visual inspection of the drug in the vessel is thus easier.

The pharmaceutical vessel 30 provided with the proposed labeling set 1, i.e. the pharmaceutical packaging unit 50 thus formed, can be manufactured efficiently and at low cost and price by means of a highly automated manufacturing sequence adding only a few additional process steps. Not only can product components serving as first-opening proofs be easily inserted into the manufacturing process, but also the option of a digitally performed first-opening proof for the detection of manipulative interventions ("tampering") can be easily realized without any disadvantageous additional effort during manufacturing; in particular with the help of the measurement line 4.

In addition, the labelable or electronically markable area is noticeably increased without the need to attach protruding flags to the label 20 as movable marking parts which could get in the way, be damaged or destroyed during rotary printing processes, or adversely affect further processing or manufacturing. Moreover, an RFID tag (RFID transponder) applied or positioned on the vessel attachment 10, for example on its circumferential surface 10a or on other surface areas of the circumferential wall 12 or another surface portion of the vessel attachment 10, remains permanently adhered thereto and is not subject to the risk of being accidentally damaged or torn off during further manufacturing or packaging or during transport.

The additional surface area achieved by the vessel attachment 10 for accommodating label and/or transponder 5 also makes it possible to size the transponder sufficiently and generously (especially its antenna) to achieve more reliable communication via radio; unlike on the individual pharmaceutical vessel itself, which must make do with its own surface as a labeling area, there is no longer any need to size a transponder smaller than actually desired. Furthermore, UHF RFID tags with standard designs or dimensions can also be used and at the same time achieve significantly higher performance than in the case of the conventionally practiced application directly to the vessel body 31.

Any pharmaceutical primary vessel 30 can therefore be provided with a suitably shaped additional capsule, cap, attachment sleeve or other design of the vessel attachment with the additional labeling area 10a; 12 and can be raised in the axial direction, since the vessel attachment 10 serving as an extension piece or continuation piece can be stably attached to the vessel body 31 or vessel belly 30b.

Stable and secure mounting of the vessel attachment 10 on the vessel 30 itself—whether on the vessel closure 32, on the vessel body 31 (in particular on the vessel neck just below the closure 32) or on both—can be achieved, for example, by positive locking, alternatively or additionally also by latching (for example with the aid of hooks or other suitable projections). The vessel attachment 10 proposed according to this application can also be easily attached to commercially available vial flip-off closures, Luer-Lock closures or needle-shield attachments, etc.

The additional marking surface 10a, which is flush with or at least aligned with the peripheral surface 30a of the vessel, continues or extends the actual peripheral surface 30a of the vessel without creating any major steps or edges between them that would complicate or jeopardize safe handling. The top cap, top sleeve or otherwise shaped vessel top 10 closes flush with the vessel body 30; 31, creating a uniform round body; vessel 30 and attachment 10 can be labeled easily and trouble-free, in particular free of folds and steps, with standardly applied automated label dispensing routines, processes and equipment. In the area of the, for example, annular transition or intermediate space between the vessel belly 30b and the vessel attachment 10, the vessel attachment 10 can be easily removed again at any time with an opening strip 14b or a perforation 14a, punching or other embodiment of the cut-through area 14, saving effort. This also benefits an optional use of the vessel attachment 30 as an initial opening indicator.

The vessel attachment 10 represents an extension piece which practically seamlessly connects to the markable surface 30a; it is easily removable from the vessel 30 again. Due to its stable attachment or fastening in the predetermined relative position to the vessel, there is no fear of interference with the handling and automated application or dispensing of label 20 and/or transponder 5 onto the vessel 30 and onto the vessel attachment 10 during the process steps for printing and dispensing labels and/or transponders.

The RFID transponder 5 can be integrated into a label section or surface area of a label 20 or label, which is placed on the vessel attachment 10 (formed as a cap or other extension piece) placed both in the radial direction and in the axial direction z at a large distance from the liquid volume 40 enclosed or enclosable in the vessel 30.

The label 20 is expediently also used at the same time for visual marking and identification of the vessel or container; the regularly provided labeling process of the vessel as well as the fixing or positioning of the cap 30 and also the provision of a means suitable as a first-opening proof as well as the placement of an RFID transponder 5 (in a readable position and in the required transponder dimension size) can all be realized in one process step or at least in one process sequence. Moreover, by means of the container attachment, the skilled person is provided with a practicable method for reliable initial opening verification by means of a transponder. A comparably good, in particular space-saving and trouble-free implementation of a "tamper evidence" solution using RFID transponders is not yet known.

The vessel attachment 10 intentionally exaggerates the outer contour at the circumference of the vessel; for one thing, beyond the height of its vessel belly 30b; optionally also beyond the height of the vessel 30 as a whole; for example, even beyond the vessel closure 32. For example, the axial extent or dimension of the vessel attachment 10 may be twice or three times the axial dimension, or height dimension, of the vessel closure 32. A comparably significant increase in the height of the packaging unit 50 or the marking surface 30a, 10b beyond the height of the individual vessel 30 has not yet been achieved in a conventional vessel.

The vessel attachment 10 serving as an axial extension piece or axial extension has the same radius or diameter D on the outside, i.e. in the radial direction (and the same circumference in the circumferential direction), as the belly 30b of the body 30; this extension piece 10; 100, which has identical lateral dimensions on the outside or all around, preferably extends close up to the transition between the vessel neck and the marking surface 30a (i.e. between h1 and h2).

The vessel attachment 10 serving as a secondary closure can be securely and stably attached to the primary closure 32, for example, by form-fitting, interlocking and/or latching with the vessel neck and/or the vessel closure.

The enclosed vessel fluid 40 cannot reach the transponder 5 attached to or placed on the vessel cap 10, even when the vessel is lying down or otherwise twisted in orientation, and thus can no longer interfere with or jeopardize the communication or readability of the transponder 5.

Of course, the outer wall 12 or outer peripheral surface 10a of the vessel attachment 10 may also have air gaps or other recesses or depressions; whether in the axial direction z or in the radial direction outwardly. Due to the preferably round or cylindrical shape of the circumference of the vessel and/or attachment, the circumferential surface 10a forms a stable abutment surface even if radial pressure is exerted on the label 20 and/or the transponder 5, for example, by impacts or gripping from the outside.

Finally, the sufficiently large dimensionable protrusion, i.e. axial extension, of the markable circumferential surface by means of the vessel attachment 10 provides sufficient space to also dimension the antennas, perforations or tear strips, etc., even more generously, which makes handling even more user-friendly.

An optional measurement line 4 (designed, for example, as an additional sensor conductor loop, conductor path or other sensor conductor path) can extend at least in sections into the lower, first label section 21 for application to the vessel body 31 and thus be guided over the perforation 14a or the tear strip 14b between the two label sections 21, 22.

If two transponders 5a, 5b are provided in, on or under the label 20 (one of which is preferably positioned on the circumferential surface 30a of the vessel 30 after labeling and the other of which is positioned on the vessel attachment 10, for example), in the filled vessel state only the transponder 5a placed on the vessel attachment 10 is readable, whereas in the emptied state preferably only the lower transponder 5b is readable and/or preferably only the lower transponder 5b can be read or detected via RFID; namely when the contents are almost empty or a critical filling state has been reached (see above).

In case of using (at least also) a combined UHF-NFC transponder, which can communicate or at least be read out via UHF frequencies as well as via HF frequencies (e.g. at 13.56 MHz), this combination transponder can, thanks to its additional HF or NFC readability, also come to lie directly on the surface or circumferential surface 30a of the vessel body 30; for example, in order to enable a read-out via smartphone or reader; e.g. for booking operations. Inventory checks of larger quantities of packaging units 50, on the other hand, can be performed more reliably and efficiently using a UHF frequency.

Otherwise, the tear strip 14b or other cut-through area 14 is designed to damage or destroy the inlay of the label 20 (which may include, in particular, the transponder(s) 5; 5a, 5b), making it impossible to read it after it has been opened for the first time.

Moreover, depending on the type and geometry of the pharmaceutical vessel 30, the vessel attachment 10 of the labeling set 1 can also be in two parts or in one part, but divisible into two parts. For example, in the case of a vessel attachment intended for a syringe according to FIG. 2, this can have a lower attachment section, an upper attachment section and, in the axial direction between the two attachment sections, an attachment severing region, so that when a pharmaceutical vessel 30 provided with the vessel attachment 10 is opened, for example, the attachment severing region of the vessel attachment 10 is severed and the upper attachment section together with the vessel attachment 10 is severed from the lower attachment section and the vessel body 30.

Further, it may be provided that the vessel attachment 10 is formed either in two parts or in one part but divisible into two parts, and that the vessel attachment 10 has a lower top portion, an upper top portion and, in the axial direction z between the two top portions, a top-separating portion, so that when one of the pharmaceutical vessels 30 provided with the vessel attachment 10 is opened, the cap severing portion of the vessel attachment 10 is severed and the upper cap portion is severed together with the vessel attachment 10 from the lower cap portion and the vessel body 30.

Further, it may be provided that the attachment severing portion is disposed at a position on the vessel attachment 10 which corresponds to the position of a transition between a vessel body 31 and a vessel closure 32 of the vessel 30 when the vessel attachment 10 is disposed at the pre-defined position on a vessel 30 to be marked.

Further, the vessel attachment 10 may include a recess that penetrates a wall of the vessel attachment 10 so as to allow fluid or air exchange between an interior space and an exterior space of the vessel attachment 10.

Further, an adhesive layer may be disposed on an underside of the label 20 such that the label 20 is attachable to the vessel 30 by adhesion, the label 20 having an adhesive-free surface in the severing region 14.

Otherwise, whenever in one of the embodiments of this application the transponder, the chip, the RFID antenna and/or the measuring lead is mentioned, the transponder, the chip, the RFID antenna and/or the measuring lead may also be printed or imprinted on the label, optionally on the label back side or on the label outer side (of a single-layer or multilayer label with one or more films or film layers), or alternatively also on the label back side or on the label outer side (of a single-layer or multilayer label with one or more films or film layers), foil layers), or alternatively also on one of several foils of a label, in order to be arranged within the finished label.

REFERENCE SIGNS 1 labeling set
4 severing measurement line
5 RFID transponder
5a first RFID transponder
5b second RFID transponder
6 transponder chip
7 transponder antenna
8 UHF RFID transponder
9 HF RFID transponder
10 vessel attachment
10a peripheral surface
11 inner contour
12 peripheral wall
12a peripheral surface
14 severing area
14a perforation
14b tear strip
20 label
21 first label section
22 second label section
30 vessel
30a circumferential surface
30b vessel belly
31 vessel body
32 vessel closure
40 liquid
50 pharmaceutical packaging unit
100 molded part
h1 height section
h2 further height section
z axial direction

The invention claimed is:

1. A labeling set (1) for marking a pharmaceutical vessel (30) comprising a vessel body (31) having an outer periphery and a removable vessel closure (32),
wherein the labeling set (1) comprises at least the following:
a vessel attachment (10) formed as a three-dimensional molded part (100),
a label (20) for sticking on the outer circumference of a pharmaceutical vessel to be marked, the label (20) comprising a first label portion (21) for sticking and/or placing on the peripheral surface (30a) of the vessel body (31), a second label portion (22) for adhering and/or applying to the peripheral surface (10a) of the vessel attachment (10), and a severing area (14) arranged between the two label sections (21, 22), which is damaged or destroyed as intended when a vessel (30) provided with the labeling set (1) is opened,
an RFID transponder (5) for electronic identification of a pharmaceutical vessel and/or its contents, and
a measurement line (4) or cut-through indicator line (4), which is connected to the RFID transponder and crosses the severing area (14),
wherein the vessel attachment (10) can be mounted and/or positioned on the vessel in a predefined relative position and has a circumferential wall (12) with an outer circumferential surface (10a) which is intended as an additional labelable and/or electronically identifiable outer wall and/or outer surface and whose radius, outer circumference and/or wall profile is selected in accordance with the radius, outer circumference and/or wall profile of the circumferential surface of a vessel to be labeled,
wherein the label (20) and/or the RFID transponder (5) is intended and designed to at least partially stick over and/or cover both a circumferential surface (30a), formed in accordance with the outer circumference, of the vessel body (31) and the circumferential surface (10a) of the vessel attachment (10) and/or to secure the vessel attachment (10) to the pharmaceutical vessel (30), so that a flush or aligned transition is formed between the circumferential surface (10a) of the vessel attachment (10) and the outer surface of the vessel body (31) provided therewith, and wherein the vessel attachment (10), mounted in the predefined relative position on a vessel (30) to be labeled and/or attached thereto, can be removed from the vessel closure (32) after severing the label (20) or can be removed from the vessel body (31) together with the vessel closure (32).

2. The labeling set (1) according to claim 1, wherein the RFID transponder (5) is connected, in particular bonded, to the label (20), which is intended for adhesion at least also to the circumferential surface (30a) of a vessel body (31) to be marked.

3. The labeling set (1) according to claim 1, wherein the RFID transponder (5) is glued onto the circumferential surface (10a) of the vessel attachment (10) and/or is connected, in particular glued, to a label section (22) of the label (20) intended for gluing and/or positioning on the circumferential surface (10a) of the vessel attachment (10).

4. The labeling set (1) according to claim 1, wherein the RFID transponder (5) is a UHF RFID transponder (8), in particular a UHF RFID transponder (8) intended for communication with one or more frequencies between 860 and 960 MHz.

5. The labeling set (1) according to claim 1,
wherein the labeling set (1) comprises a first RFID transponder (5a) and a second RFID transponder (5b),
wherein at least the first RFID transponder (5a) is a UHF RFID transponder (8) intended for sticking and/or positioning in a height section (h2) defined in the axial direction (z), in which the circumferential wall (12) and/or circumferential surface (10a) of the vessel attachment (10), in the predefined relative position on a vessel (30) to be marked, is mounted and/or attached, arranged and/or still to be arranged.

6. The labeling set (1) according to claim 1,
wherein the vessel attachment (10), which is designed as a three-dimensional molded part (100), is intended for fitting and/or mounting on a vessel (30) having a vessel body (31) whose circumferential surface (30a) has a predetermined, preferably constant radius, outer circumference and/or wall profile over a height section (h1),
wherein the circumferential wall (12) and/or circumferential surface (10a)
extends over another, additional height section (h2) which does not overlap with the height section (h1) of the circumferential surface (30a) of a vessel (30) to be marked in accordance with the intended use, and
has a radius, outer circumference and/or wall profile which is selected to be identical to the radius, outer circumference and/or wall profile of the circumferential surface (30a) in the height section (h1) of the vessel (30) to be marked.

7. The labeling set (1) according to claim 1, wherein the vessel attachment (10) is shaped in such a way that, in the predefined relative position in which it is to be placed and/or mounted on the vessel (30), on the vessel closure (32) and/or on a region of the vessel body (31) surrounding the vessel closure (32), it extends on the closure side on or above a vessel belly (30b) of the vessel body (31), which belly is designed with a maximum radius, outer circumference and/or wall course of the vessel body (31), without overlapping with the height section (h1) of its vessel belly (30b) and/or without surrounding the vessel body (31) at the height (h1) of its vessel belly (30b), in particular without turning it upside down or over.

8. The labeling set (1) according to claim 1, wherein the labeling set (1) is intended for a symmetrically, in particular rotationally symmetrically or cylindrically shaped vessel (30) and/or a vessel body shaped in this way, a symmetry axis specifying an axial direction (z) of the vessel (30) and/or vessel body.

9. The labeling set (1) according to claim 1, wherein the circumferential wall (12) and/or outer circumferential surface (10a) of the vessel attachment (10) is formed as an additional labeling surface and/or labeling surface which, in the predefined relative position of the vessel attachment (10), runs around a symmetry axis of a vessel (30) to be labeled as intended and/or of its vessel body (31) and has the same diameter, circumference and/or wall profile as the vessel body (31), circumference and/or wall profile as the diameter, circumference and/or wall profile of a vessel (30) to be marked as intended, so that the cylindrical circumferential surfaces (10a, 30a) of the vessel attachment (10) and of a vessel provided therewith run flush or at least in alignment relative to one another.

10. The labeling set (1) according to claim 1, wherein the RFID transponder (5) is a UHF RFID transponder (8) comprising a UHF RFID chip and a UHF RFID antenna.

11. The labeling set (1) according to claim 1, wherein the vessel attachment (10) is
two-part or
one-piece, but divisible into two parts, and
wherein the vessel attachment (10) has a lower attachment section, an upper attachment section and, in the axial direction (z) between the two attachment sections, a attachment severing portion, so that when a pharmaceutical vessel (30) provided with the vessel attachment (10) is opened, the attachment severing region of the vessel attachment (10) is severed and the upper attachment section together with the vessel attachment (10) is severed and/or can be severed from the lower attachment section and the vessel body (30).

12. The labeling set (1) according to claim 11, wherein the attachment severing portion is arranged in a position on the vessel attachment (10) which corresponds to the position of a transition between the vessel body (31) and the vessel closure (32) of a vessel (30) to be labeled when the vessel attachment (10) is arranged in the predefined position on a vessel (30) to be labeled.

13. A pharmaceutical packaging unit (50) comprising:
a pharmaceutical vessel (30) having a vessel body (31) with a peripheral surface (30a) and a removable vessel closure (32),
the labeling set (1) according to claim 1, comprising a vessel attachment (10), a label (20), and an RFID transponder (5),
wherein the vessel attachment (10) is mounted and/or positioned in a predefined relative position on the vessel (10), whereby its circumferential wall (12) and/or outer-side circumferential surface (10a) is arranged flush or at least aligned with the vessel belly (30b) and/or the circumferential surface (30a) of the vessel body (81),
wherein the label (20) is partially adhered and/or applied to the peripheral surface (80a) of the vessel body (31)

and partially to the peripheral surface (10*a*) of the vessel attachment (10), and wherein the RFID transponder (5) is arranged on the pharmaceutical vessel (30), on the vessel attachment (10) and/or on or in the label (20).

\* \* \* \* \*